(12) United States Patent
Scherzer (10) Patent No.: US 7,079,809 B1
(45) Date of Patent: Jul. 18, 2006

(54) SYSTEMS AND METHODS FOR PROVIDING IMPROVED WIRELESS SIGNAL QUALITY USING DIVERSE ANTENNA BEAMS

(75) Inventor: Shimon B. Scherzer, Sunnyvale, CA (US)

(73) Assignee: Kathrein-Werke KG, Rosenheim (DE)

( * ) Notice: Subject to any disclaimer, the term of this patent is extended or adjusted under 35 U.S.C. 154(b) by 579 days.

(21) Appl. No.: 10/072,299

(22) Filed: Feb. 7, 2002

(51) Int. Cl.
*H04B 1/38* (2006.01)
*H04M 1/00* (2006.01)

(52) U.S. Cl. .......................... 455/39; 455/69; 455/101; 455/562.1

(58) Field of Classification Search ................. 455/65, 455/101, 135, 69, 275, 522, 562.1, 63.3, 455/512–513, 452.1, 452.2, 575.7; 375/299, 375/347, 267; 370/334
See application file for complete search history.

(56) References Cited

U.S. PATENT DOCUMENTS

| | | | | |
|---|---|---|---|---|
| 5,093,668 A | * | 3/1992 | Sreenivas | 342/374 |
| 5,491,833 A | * | 2/1996 | Hamabe | 455/422.1 |
| 5,752,200 A | * | 5/1998 | Meredith et al. | 455/562.1 |
| 5,771,017 A | * | 6/1998 | Dean et al. | 342/374 |
| 6,038,459 A | * | 3/2000 | Searle et al. | 455/562.1 |
| 6,151,310 A | * | 11/2000 | Dent | 370/330 |
| 6,298,092 B1 | * | 10/2001 | Heath et al. | 375/267 |
| 6,320,898 B1 | * | 11/2001 | Newson et al. | 375/144 |
| 6,385,464 B1 | * | 5/2002 | Narita et al. | 455/561 |
| 6,396,821 B1 | * | 5/2002 | Takahashi | 370/335 |
| 6,442,405 B1 | * | 8/2002 | Hiramatsu et al. | 455/562.1 |
| 6,452,981 B1 | * | 9/2002 | Raleigh et al. | 375/299 |
| 6,529,496 B1 | * | 3/2003 | Yeom et al. | 370/345 |
| 6,594,475 B1 | * | 7/2003 | Anvekar et al. | 455/277.1 |
| 6,671,516 B1 | * | 12/2003 | Doi | 455/509 |
| 6,697,643 B1 | * | 2/2004 | Hagerman et al. | 455/562.1 |
| 2002/0154705 A1 | * | 10/2002 | Walton et al. | 375/267 |

* cited by examiner

*Primary Examiner*—Simon Nguyen
(74) *Attorney, Agent, or Firm*—Fulbright & Jaworski LLP (57) ABSTRACT

The present invention is directed to wireless communication, and more particularly, to providing improved signal quality using antenna beam selection and/or switching techniques. Embodiments of the present invention may measure the carrier-to-interference (C/I) level for each channel and for each antenna. Embodiments of the present invention assign forward-link signals to antennas such that only one forward-link signal is transmitted from a respective antenna. Moreover, embodiments prioritize assignment to antennas by the forward-link power, i.e., the forward-link signal associated with the highest power is transmitted from the antenna associated with the best channel quality metric for reverse-link of the respective channel. Additionally, embodiments may employ the assignment scheme with antennas that possess spatial, polarization, and/or directional diversity to minimize the effects of shadow fading.

25 Claims, 4 Drawing Sheets

FIG. 6 ical field of the invention

SYSTEMS AND METHODS FOR PROVIDING IMPROVED WIRELESS SIGNAL QUALITY USING DIVERSE ANTENNA BEAMS

TECHNICAL FIELD OF THE INVENTION

The present invention is directed to wireless communication, and more particularly, to providing improved signal quality using antenna beam selection and/or switching techniques.

BACKGROUND OF THE INVENTION

In typical time division multiple access/time division multiplexing (TDMA/TDM) cellular systems (e.g., IS-136 and Groupe Special Mobile (GSM) systems), a diversity antenna scheme is utilized. For example, a typical cellular site employs a sectorized coverage scheme. For each sector, one transmit and two receive antennas are utilized. The two receive antennas are, for example, placed on a site tower and are separated by a sufficient number of wavelengths to avoid being correlated for the purposes of Raleigh fading. On the reverse-link (i.e., from the subscriber to the cell site receivers), a signal from a subscriber is received by both receive antennas. Both receive antennas are coupled to diversity ports of a receiver before digitally sampling and combining. Since the two antennas are sufficiently separated for the purposes of diversity, the combined signals from the two antennas provide a relative degree of robustness to Raleigh fading.

In urban environments, the varied morphology defined by the profile of buildings and other various obstacles presents unique challenges. In particular, the quality of a traffic channel within a particular coverage area or sector of a cell site may vary significantly as a subscriber moves through the particular coverage area or sector. The signal strength may experience "shadow fading" when a subscriber moves behind a corner of a neighboring building for example. Accordingly, the system may attempt to respond by appreciably increasing the transmit power associated with that subscriber. The increased power tends to increase the channel quality for that subscriber, at least initially. However, the increase in power tends to interfere with other subscribers in the same coverage area. Accordingly, these other subscribers may experience a decrease in quality and/or respond with similar increases in transmit power levels, thereby decreasing overall quality.

Moreover, it shall be appreciated that typical cellular antenna configurations are not effective at reducing shadow fading. For example, the discrete antennas of the typical base station antenna configurations discussed above are usually disposed from each other by approximately three to four meters. Accordingly, the difference in signal path, although sufficient for typical Raleigh fading characteristics, is quite negligible, and, hence, cannot sufficiently mitigate shadow fading characteristics associated with a dense urban environment or similar topological characteristics. It shall be appreciated that typical antenna configurations are limited to three to four meters due to spacing constraints associated with tower configurations at cell cites. For example, many individuals who lease space for cellular antennas are concerned with the aesthetics associated with the cellular antennas and will not permit an unduly bulky antenna system apparatus to be visible. Accordingly, base stations have been developed to utilize this common antenna configuration. Such base station configurations have, therefore, tended to use the typical antenna configuration even when deployed in different environments, such as upon the face of a building in a dense urban environment, as the base station equipment does not require substantial modification for use and the antenna configuration provides a deployment that has gained at least a certain amount of acceptance by property owners.

BRIEF SUMMARY OF THE INVENTION

The present invention is directed to systems and methods which provided improved signal quality using antenna beam selection and/or switching techniques. Embodiments of the present invention are operable to minimize the total power and/or the variance of power of a wireless communication system. Accordingly, embodiments of the present invention are operable to significantly improve channel quality of a wireless communication system and also to some level of system capacity improvement.

Embodiments of the present invention are operable in a wireless communication environment where a plurality of antennas are used to transmit and receive traffic channels. Each of a plurality of antennas are preferably associated with approximately a same coverage area (e.g., a sector). In embodiments of the present invention, the antennas may be employed in an urban environment. For example, the antennas may be implemented to possess spatial, polarization, and/or direction variability. Preferably by utilizing spatial, polarization, and/or directional variability associated with such a deployment of antennas, as well as through use of preferred embodiment antenna beam selection techniques, embodiments of the present invention may be utilized to address the unique issues (e.g., shadow fading) associated with dense urban, and similar environments.

Certain embodiments of the present invention are operable to switch or route forward-link signals to antennas without requiring power combining. Specifically, embodiments of the present invention switch or route each forward-link base station transmit signal, comprising one or more traffic channels, to a different antenna of a plurality of antennas providing overlapping illumination of an area, such as a sector.

To improve the quality of the traffic channels, embodiments of the present invention are advantageously operable to determine a carrier-to-interference (C/I) ratio (or other channel quality metric) for each channel and for each antenna in a first mode of operation. The assignment of signals on the forward-link to antennas may be selected by prioritizing channel selection against the currently utilized forward-link power. It should be appreciated that the channels associated with the highest forward-link transmission power levels are associated with the lowest channel quality. According to embodiments of the present invention, the forward-link signals of selected channels associated with the highest forward-link powers may receive priority in assignment to antennas that will exhibit the highest quality channel metric for those channels.

According to embodiments of the invention, reverse-link signals from the antennas associated with the two best C/I ratios for a particular traffic channel are switched to the respective master port and diversity port associated with the respective traffic channel. For example, antennas 1 and 3 may be associated with the highest C/I ratios for the first traffic channel and antennas 2 and 4 may be associated with the two highest C/I ratios for the second traffic channel. Accordingly, the signals from antennas 1 and 3 may be provided to the master and diversity ports associated with the first traffic channel and the signals from antennas 2 and 4 may be provided to the master and diversity ports associated with the second traffic channel.

It shall be appreciated that embodiments of the present invention differ significantly from typical cellular schemes. Specifically, typical cellular schemes simply vary the forward-link power in response to shadow fading and antenna beam pattern. Although this may provide improved channel quality for the particular channel associated with the shadow fading, it tends to decrease overall system quality. In particular, the adaptive changes to forward-link power increases the total forward-link power and the variance of forward-link power in the coverage area. Therefore, system quality (e.g., as measured by frame error rate for all channels) is reduced.

However, embodiments of the present invention utilize spatial, polarization, and/or directional diversity, in part, to address shadow fading and antenna coverage limits. Assignment of signals to particular antenna beams in accordance with embodiments of the present invention increases the channel quality for the signals associated with the highest forward-link transmit power levels to a significant degree. Upon assignment to optimal antennas, the transmit power levels associated with those channels will be appreciably reduced. However, the assignment of other signals to non-optimal antennas (e.g., out of the remaining antennas) does not appreciably reduce their channel quality or appreciably increase their transmit power levels. Thus, their assignment to non-optimal antennas will have a minimal effect on the signal quality thereof while minimizing individual signal transmit power variance and optimizing overall system signal quality.

Embodiments of antenna beam assignment techniques of the present invention assume that the rate of Raleigh fading is sufficiently fast. However, particular usage patterns may result in a relatively slow rate of Raleigh fading. If the communication channel is associated with a relatively slow rate of Raleigh fading, frequency hopping averaging may be employed in association with antenna selection according to embodiments of the present invention. If the rate of Raleigh fading is sufficiently low and frequency hopping averaging does not provide for diversity in averaging, embodiments of the present invention may employ a second mode of operation, such as to employ an Orthogonal Transmit Diversity (OTD) antenna beam assignment scheme.

Preferred embodiments of the present invention provide cost advantages in that they may be implemented by minimally modifying existing cellular equipment associated with cell cites. Specifically, typical cell sites include multiple antennas, transceiver units, power amplifiers, and low noise amplifiers, which may be reused according to embodiments of the present invention. Embodiments of the present invention may be implemented as an "applique," that is, minimal additional equipment (e.g., additional antennas, switch matrix, and/or a suitable controller) may be added without requiring modification of other system components. Additionally, certain embodiments of the present invention provide cost advantageous by applying only one forward-link signal to a respective antenna. By doing so, embodiments of the present invention do not require power combining circuitry or additional amplification circuitry and, hence, are associated with significant cost advantageous.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
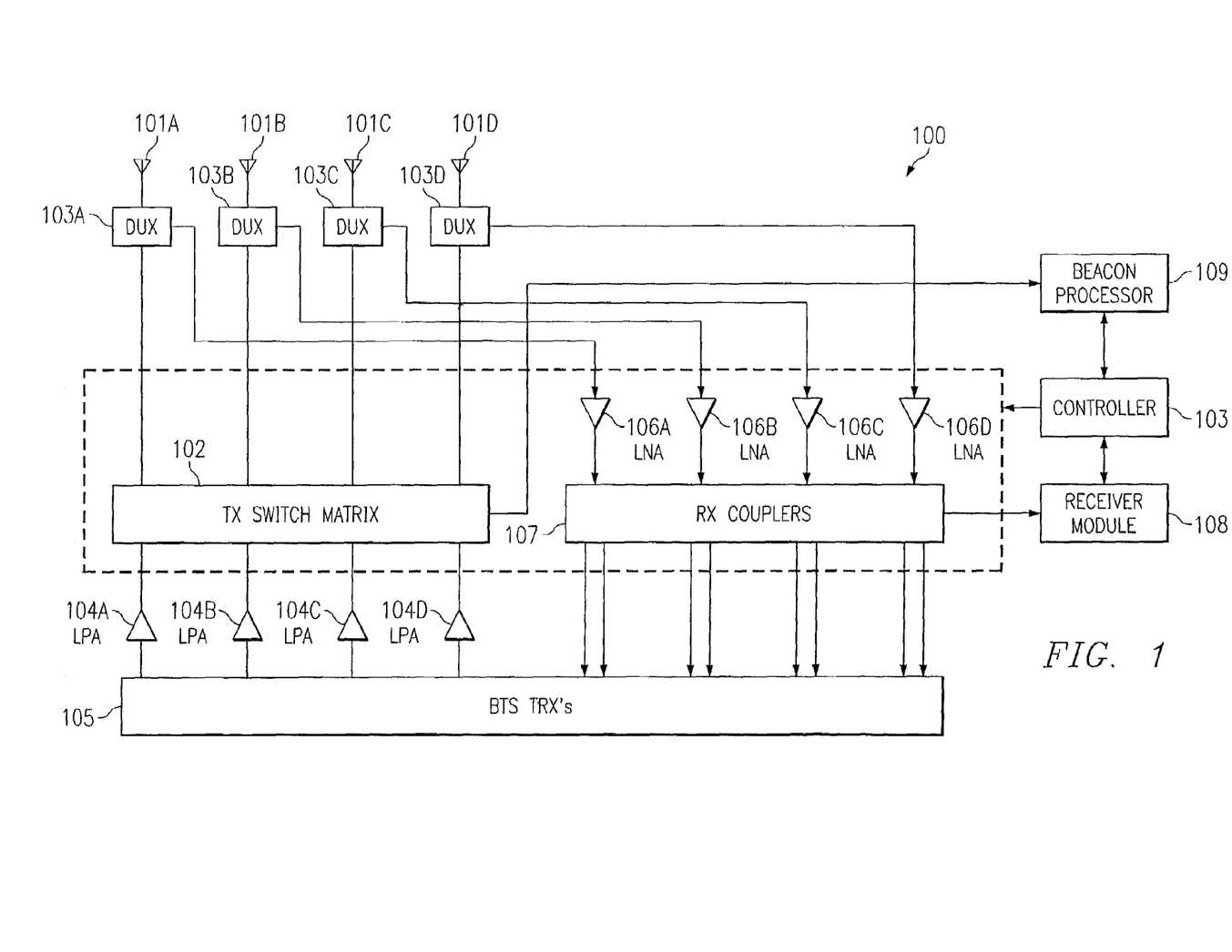
FIG. 1 depicts an exemplary wireless communication system according to embodiments of the present invention.

Referring now to the Drawing, FIG. 1 depicts exemplary wireless communication system 100 according to embodiments of the present invention. Wireless communication system 100 comprises a plurality of antennas 101A–101D. In accordance with embodiments of the present invention, antennas 101A–101D may be disposed to provide approximately a same coverage area. Preferably, antennas 101A–101D are distantly disposed so as the provide diversity against shadow fading. Other diversity techniques may be employed such as polarization diversity or directional diversity. Also, any combination of diversity techniques may be employed. For the present example, four antennas 101A–101D are shown. However, it shall be appreciated that the number of antennas is merely exemplary as other numbers of antennas may be used according to embodiments of the present invention.

Duplexers 103A through 103B are coupled to antennas 101A through 101D. Duplexers 103A and 103D apply forward-link signals from TX switch matrix 102 to antennas 103A through 103D. Duplexers 103A and 103D provide reverse-link signals from antennas 101A through 101D to low noise amplifiers (LNAs) 106A and 106D.

Figure 3:
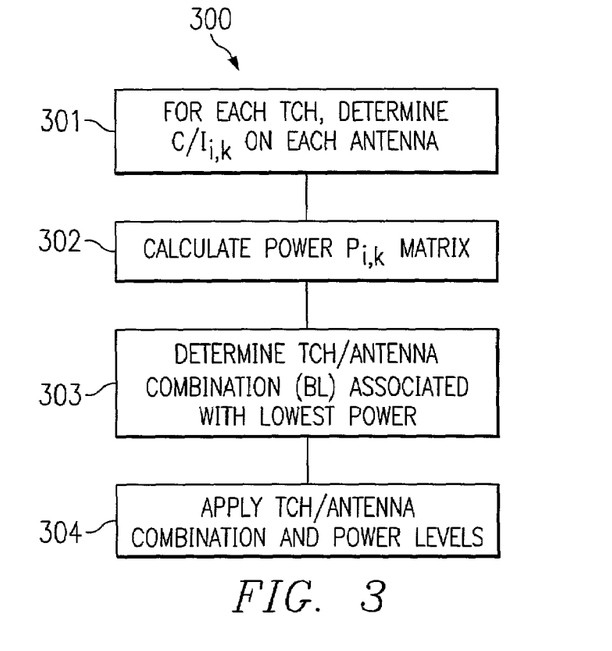
FIG. 3 depicts an exemplary flowchart for assignment of forward-link signals to antennas according to embodiments of the present invention.
Figure 5:
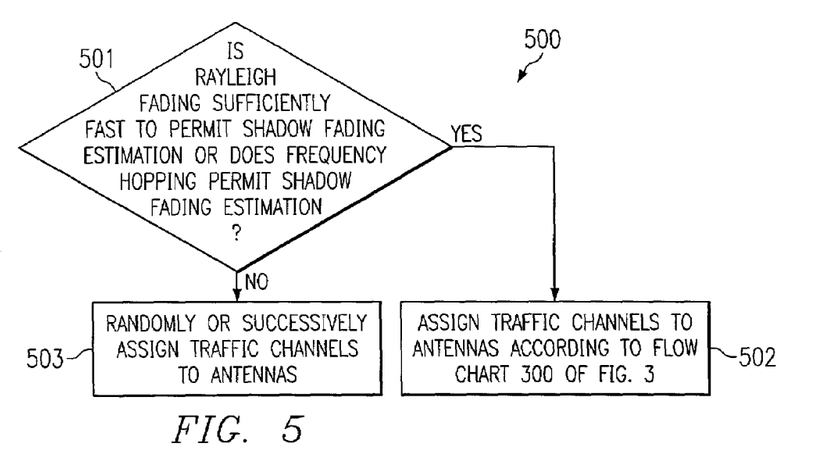
FIG. 5 depicts an exemplary flowchart for selection of a mode of operation of a wireless communication system according to embodiments of the present invention.

Switch matrix 102 of the illustrated embodiment is operable to switch wireless signals to and from antennas 101A and 101D as will be discussed in greater detail below. Switch matrix 102 preferably operates under the control of controller 103, i.e., controller 103 may send an appropriate control signal to switch matrix 102 to cause a particular forward-link signal to be communicated via a selected antenna of antennas 101A–101D. Controller 103 may be implemented utilizing a suitable processor (not shown) operating under executable instructions according to embodiments of the present invention, such as a general purpose computer system based upon the INTEL PENTIUM processor platform executing a program defining the operation as described herein. For example, the processor of controller 103 may execute software instructions that implement the process flow of flowcharts 300 and 500 according to embodiments of the present invention. Such preferred embodiment software instructions may be stored on any suitable computer-readable medium such as PROM, EPROM, EEPROM, hard disk medium, optical disk medium, and/or the like that is accessible by controller 103.

Power amplifiers (LPA) 104A–104D may be utilized to amplify transmit signals received from BTS TRXs 105 before the signals are provided to duplexers 103A–103D. As an example, wireless communication system 100 utilizes BTS TRX's 105 to transmit and receive signals associated with subscribers in the coverage area. As is well known in the art, "BTS" is an acronym used by the GSM cellular standard for Base Transceiver Station. "TRX" refers to transceiver sub-components of the BTS. Although embodiments of the present invention are described as being operable in GSM systems, the present invention is not so limited. Embodiments of the present invention may be utilized in any suitable wireless communication system, such as those operating according to protocols implementing time division multiplexing.

Low noise amplifiers (LNA) 104A–104D may be utilized to amplify received reverse-link signals from subscribers in the coverage area before the signals are provided to BTS RX couplers 107. In accordance with preferred embodiments of the present invention, signals from two of antennas 101A–101D are provided to the diversity receive ports of BTS TRX's 105.

Beacon processor 109 is included in wireless communication system 100 to synchronize the wireless communication according to the broadcast control channel (BCCH) which is defined by the GSM standard. In embodiments of the present invention, the BCCH may be transmitted via alternate antennas.

Receiver module 108 is preferably operable to measure the C/I ratio (or other channel quality metric) for each traffic channel (TCH) for each antenna 101A–101D. For the present example, receiver module 108 may preferably be implemented as a four channel coherent receiver. Controller 103 preferably utilizes measured channel quality metrics, such as the C/I ratios measured by receiver module 108, to select to which antenna 101A–101D the forward-link TCH signals are switched as will be discussed in further detail with respect to FIG. 3.

In accordance with embodiments of the present invention, controller 103 is operable to cause only one forward-link channel signal to be coupled to a respective antenna of antennas 101A–101D. By switching only one signal to a respective antenna, embodiments of the present invention do not require combining of the forward-link signals and avoids attendant loss associated with such non-coherent combining. Accordingly, embodiments of the present invention do not require additional amplification circuitry to compensate for the combining loss as is associated with typical wireless communication systems. Although embodiments provide only one channel to a respective antenna, the present invention is not so limited. Embodiments of the present invention may be employed in association with any assignment scheme that is associated with assigning priority to antennas to provide signal quality improvement.

Embodiments of the present invention may preferably be implemented as an "applique," that is, minimal additional equipment (e.g., additional antennas, switch matrix, and/or a suitable controller) may be added without requiring modification of other system components. By implementing embodiments of the present invention in this manner, the system quality of existing cellular systems may be increased without adding substantial amounts of circuitry and devices and without incurring unnecessary expense. Additionally, it shall be appreciated that implementations as an applique do not appreciable decrease the aesthetics of a roof-top configuration. Specifically, the only elements that are likely to be exposed in a line-of-sight manner are the additional antennas. However, the antennas may be distantly disposed across the roof-top. Accordingly, their aesthetic impact may be quite limited in an urban environment.

Figure 2:
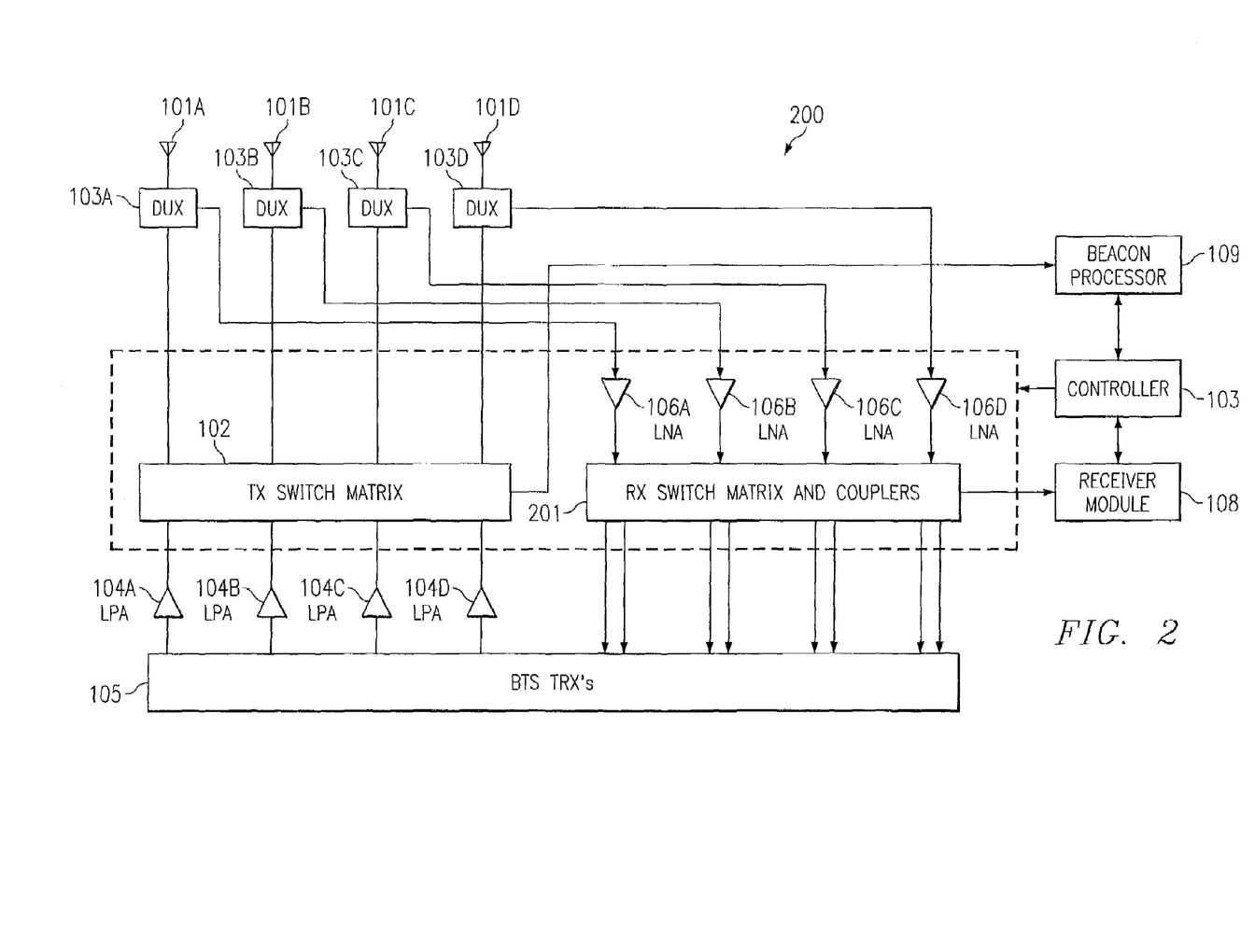
FIG. 2 depicts another exemplary wireless communication system according to embodiments of the present invention.

FIG. 2 depicts wireless communication system 200 according to further embodiments of the present invention. Wireless communication system 200 is substantially similar to wireless communication system 100. However, wireless communication system 200 comprises RX switch matrix 201. RX switch matrix 201 is preferably controlled by controller 103. According to embodiments of the invention, controller 103 may cause the reverse-link signals from antennas 101A–101D associated with the two best C/I ratios for a particular TCH to be switched to the respective diversity port associated with the respective TCH. For example, antennas 101A and 101C may be associated with the highest C/I ratios for the first TCH and antennas 101B and 101D may be associated with the two highest C/I ratios for the second TCH. Accordingly, the signals from antennas 101A and 101C may be provided to the TRX diversity ports associated with the first TCH and the signals from antennas 101B and 101D may be provided to the TRX diversity ports associated with the second TCH.

FIG. 3 depicts exemplary flowchart 300 to implement TCH antenna selection and switching techniques according to embodiments of the present invention. In step 301, the C/I ratio (or other channel quality metric for the revese-link) for each TCH is preferably determined for each antenna. For example, using wireless communication system 100 as an example, four TCHs may be utilized, i.e. four forward-link signals may be transmitted during concurrent time bases on respective carrier channels. Accordingly, the C/I ratio for the first TCH may be calculated as received by antennas 101A, 101B, 101C, and 101D. Again, the C/I ratios for the second TCH, the third TCH, and the fourth TCH may be similarly calculated.

In step 302, a power matrix preferably is calculated. Each term $(P_{i,k})$ of the preferred embodiment power matrix represents the power level that will be used for the respective TCH if that TCH is assigned to the $i^{th}$ antenna after reassignment according to step 304. The terms $(P_{i,k})$ of the matrix equal:

$$P_{i,k} = \frac{V_k \cdot C/I_{k,k}}{C/I_{i,k}},$$

where $C/I_{i,k}$ denotes the C/I ratio for the $k^{th}$ TCH as measured from the $i^{th}$ antenna, $C/I_{k,k}$ denotes the C/I ratio on the antenna that is currently being utilized for the forward-link of the $k^{th}$ TCH, and $V_k$ denotes the current forward-link power associated with the $k^{th}$ TCH.

In step 303, the TCH/antenna combination ($B_h$) that is associated with the lowest total transmit power is selected. In this step, the respective forward-link power ($V_k$) for each TCH is used as a measure of channel quality. If $V_k$ is high, the quality of the respective channel (TCH) is determined to be relatively poor. Accordingly, in selecting the TCH/antenna combination that is associated with the lowest total transmit power according to the present invention, the TCH associated with the highest forward-link power may be provided priority in the antenna assignment process to be assigned to the best antenna as measured by the respective C/I ratios.

Figure 4:
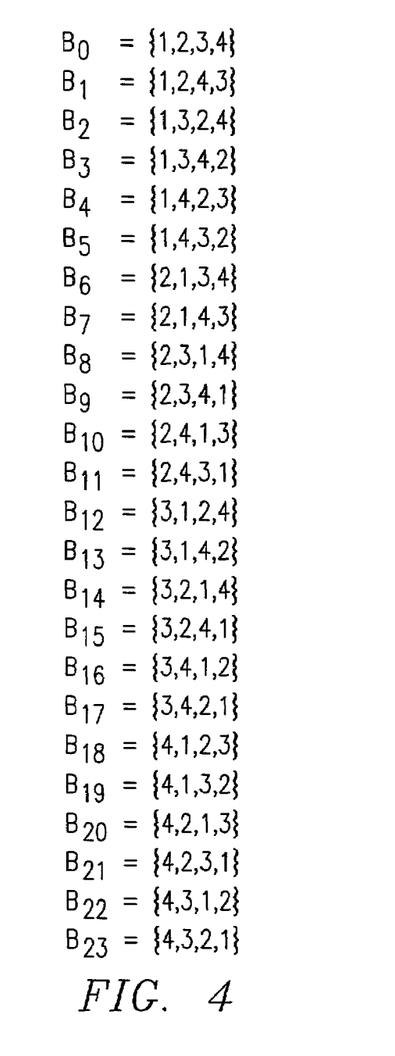
FIG. 4 depicts an exemplary set of unique assignment combination of forward-link signals to antennas according to embodiments of the present invention.

Specifically, let $B_h$ denote an assignment of the respective TCHs to the respective antennas such that each TCH is assigned to a different antenna. FIG. 4 depicts an exemplary set of every possible unique combination ($B_h$) for four TCH channels assigned to four different antennas. In this example, there are twenty-four (24) possible TCH/antenna assignment combinations. Each respective term of $B_h$ denotes the antenna assignment of the respective channel. For example, for $B_{12}$ which is {3, 1, 2, 4}, the first TCH is assigned to the third antenna, the second TCH is assigned to the first antenna, the third TCH is assigned to the second antenna, and the fourth TCH is assigned to the fourth antenna.

For each $B_h$, the respective terms from the power matrix ($P_{i,k}$) are summed. For example, the summation of the power terms for $B_{12}$ equals:

$P_{3,1} + P_{1,2} + P_{2,3} + P_{4,4}$

The $B_h$ that is associated with the lowest forward-link power level summation is selected. This assignment is based upon the assumption that the forward-link channel quality and the reverse-link channel quality are correlated. However, this assumption is not always true as will be discussed below.

In step 304, the selected TCH/antenna combination ($B_h$) is applied. Additionally, the power levels for the respective TCH after the application of the selected TCH/antenna combination ($B_h$) equals the various power terms of the combination. For example, if $B_{12}$ is selected, the power for the first TCH equals $P_{3,1}$.

Although embodiments of the present invention assign only one TCH to a respective antenna, the present invention is not so limited. Embodiments of the present invention may utilize a priority assignment scheme to minimize total forward-link power and/or forward-link power variance for any wireless communication system that restricts forward-link assignment to antennas in any manner.

As previously noted, the assignment of the TCHs to antennas is based on the assumption that the forward-link channel quality and the reverse-link channel quality are correlated. This assumption is true with respect to shadow fading. However, this assumption may not be true with respect to Raleigh fading. Raleigh fading refers to scattering due to multi-path propagation of the wireless signals. If portions of the wireless signals that propagate over multi-paths arrive out of phase, the portions may interfere with each other and, hence, the signal "fades." Additionally, Raleigh fading is frequency-dependent. Accordingly, Raleigh fading between the reverse-link and the forward-link are not correlated, because the reverse-link and the forward-link are transmitted over different carrier frequencies.

Accordingly, for shadowing effects, Raleigh fading effects are preferably eliminated from the analysis of the C/I ratios. By eliminating the effects of Raleigh fading from the analysis, the quality of the forward and reverse links are correlated and the assignment of traffic channels to antennas may occur to minimize the effects of shadow fading.

When the signal is received at wireless communication system 100 or wireless communication system 200, the path loss will be based upon shadow fading and Raleigh fading. Shadow fading will represent the statistical mean of the path loss. Raleigh fading may be represented by a fluctuation in the path loss. If there is sufficient fluctuation due to Raleigh fading over the integration time, the average shadow fading may be determined for the antenna selection algorithm. However, if the amount of Raleigh fading changes at a relatively low rate, the selection of antennas may be erroneous.

If the amount of Raleigh fading changes at a relatively slow rate, frequency hopping averaging may be utilized. Instead of employing a fixed carrier for each TCH, frequency hopping causes successive frames or sub-frames to be transmitted using different frequencies according to a hopping schedule. Frequency hopping is a spread spectrum technique that may be utilized for averaging diversity.

FIG. 5 depicts exemplary flowchart 500 according to embodiments of the present invention. Flowchart 500 depicts various logical steps which are utilized to determine an operational mode of a wireless system according to embodiments of the present invention.

Flowchart 500 begins in step 501 where it is determined whether the rate of Raleigh fading is sufficiently fast (e.g., the rate of Raleigh fading is greater than 10 Hz depending upon the implementation of the respective wireless system) to permit shadow fading estimation or whether frequency hopping permits shadow fading estimation. Both of these conditions may be determined by examining the variance of the signal strength or C/I of successive GSM signal bursts and their temporal rate of change.

If either or both of the conditions are true, the process flow preferably proceeds to step 502 where traffic channels are assigned to antennas using the algorithm described with respect to flowchart 300 of FIG. 3. If both of the conditions are false, the process flow proceeds to step 503. In step 503, the traffic channels are assigned to antennas on a random or successive basis. Specifically, sub-frames are transmitted from different antennas (e.g., four different antennas according to certain GSM wireless communication systems) according to Orthogonal Transmit Diversity (OTD) which is known in the art. Although OTD is known in the art, it is not known in the art to select between another OTD mode and an antenna assignment mode, such as that of flowchart 300 of FIG. 3 upon the basis of the criteria described herein.

Figure 6:
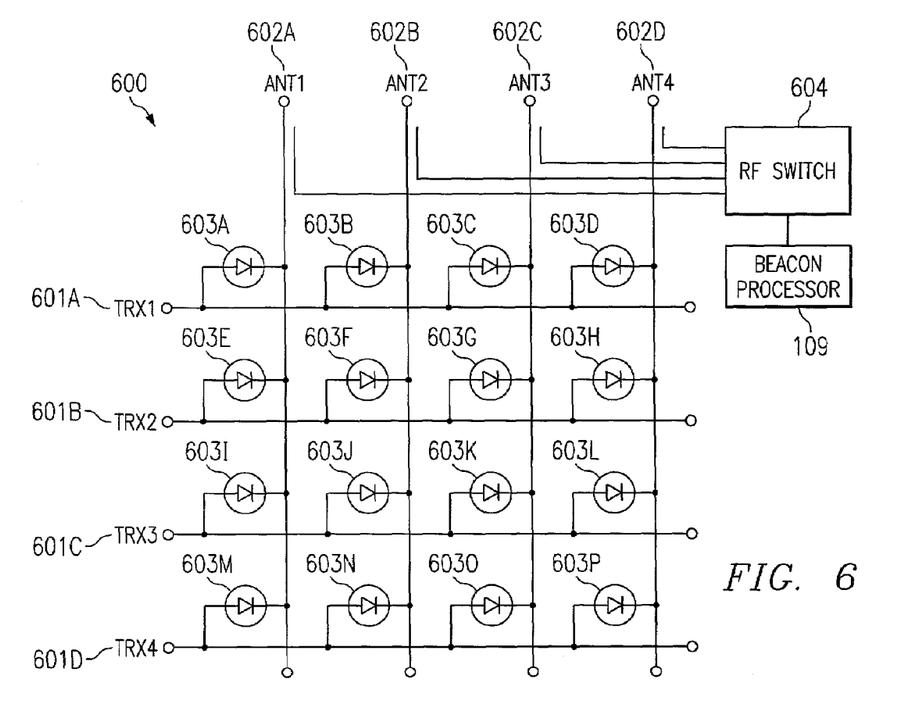
FIG. 6 depicts an exemplary switching matrix that may be implemented according to embodiments of the present invention.

FIG. 6 depicts exemplary switch 600 that may be used according to embodiments of the present invention. Switch matrix 600 comprises a plurality of input ports (601A through 601D) for TRX signals and a plurality of ports (602A through 602D) for coupling to respective antennas. Switch 600 comprises a plurality of switches 603A through 603D for coupling input ports to respective antennas. Switch matrix 600 further comprises RF switch 604 to permit beacon processor 109 to communicate BCCH to the coverage area. Switch 600 may be advantageously implemented with a minimal amount of complexity. By minimizing the complexity of switch 600, attendant combining losses are avoided thereby omitting the necessity of additional amplification circuitry to compensate for such losses.

Embodiments of the present invention provide several advantages. First, embodiments of the present invention may be implemented by minimally modifying existing cellular systems. Embodiments of the present invention may be implemented with a minimal amount of complexity by adding additional antennas, a switch matrix, and a suitable controller to typical cellular antenna systems. Further, embodiments of the present invention do not require combining circuitry and power amplification circuitry required by the combining of multiple channels for application to a common antenna. Accordingly, embodiments of the present invention reduce the cost and complexity associated with wireless and cellular communication systems.

Additionally, embodiments of the present invention are operable to increase the quality of wireless communication. Specifically, by providing transmit diversity (i.e., assigning channels to different antennas) the power variance of the wireless communication system may be reduced. Moreover, transmit diversity provides substantial advantages in urban settings. Specifically, urban settings may introduce significant and varying shadow fading. By relatively distantly disposing the antennas (across a roof-top for example), embodiments of the present invention may appreciably lower the effects of shadow fading thereby improving communication quality.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A wireless communication system comprising:
   a plurality of radios each having at least one antenna interface associated therewith;
   a plurality of antennas;
   a switch matrix that is operable to selectively couple said plurality of antennas to said antenna interfaces; and
   a controller that is operable to control said switch matrix such that a limited number of said antenna interfaces are coupled to a same antenna of said plurality of antennas, wherein said controller is operable to apply a configuration, of said antenna interfaces to said plurality of antenna, that provides priority to selected ones of a plurality of channels associated with said plurality of radios based upon power and channel quality metrics of said selected ones of said plurality of channels in a first mode of operation.

2. The wireless communication system of claim 1 wherein said plurality of antennas are arranged to provide at least one item selected from the list consisting of spatial diversity, polarization diversity, and directional diversity.

3. The wireless communication system of claim 1 further comprising:
   a coherent receiver that is operable to calculate a carrier-to-interference (C/I) ratio for each channel associated with said plurality of radios for each antenna of said plurality of antennas, wherein said coherent receiver is communicatively coupled to said controller and said controller is operable to utilize C/I ratios from said coherent receiver to assign selected ones of said plurality of channels to said plurality of antennas.

4. The wireless communication system of claim 1 wherein said controller is operable to calculate a power matrix with each term (Pi,k) of said power matrix being equal to (Vk·(C/I)k,k/(C/I)i,k), wherein Vk is a respective forward-link power associated with a kth channel, (C/I)k,k is a respective carrier-to-interference C/I ratio for the kth channel as received on an antenna that is currently being using for the kth channel, and (C/I)i,k is the respective C/I ratio associated with the kth channel as received by the ith antenna.

5. The wireless communication system of claim 1 wherein said controller is operable to determine said configuration of said antenna interfaces to said plurality of antenna by minimizing a summation of forward-link power of a plurality of channels in said first mode of operation.

6. The wireless communication system of claim 1 wherein said controller is operable to randomly assign a plurality of channels to said plurality of antennas in a second mode of operation.

7. The wireless communication system of claim 1 wherein said controller is operable to successively assign a plurality of channels to said plurality of antennas in a second mode of operation.

8. The wireless communication system of claim 1 wherein said controller operates in a second mode of operation when a fading rate of Raleigh fading of a plurality of channels is sufficiently low.

9. The wireless communication system of claim 1 wherein said controller operates in a second mode of operation when frequency hopping averaging does not allow for shadow fading estimation.

10. The wireless communication system of claim 1 further comprising:
    a second switch matrix that is operable to switch reverse-link signals to said plurality of antenna interfaces under the control of said controller.

11. A method for operating a wireless communication system, the method comprising:
    generating concurrent forward-link transmit signals for a plurality of channels;
    determining a current forward-link power for each of said plurality of channels;
    assigning, in a first mode of operation, said plurality of channels to said plurality of antennas for transmission of said concurrent forward-link signals by selecting the antenna assignment that minimizes total forward-link transmit power; and
    assigning, in a second mode of operation, said plurality of channels to said plurality of antennas for transmission of said concurrent forward-link signals when both of the following conditions are true: (i) fading rate of Raleigh fading of said plurality of channels is sufficiently low, and (ii) frequency hopping averaging does not allow for shadowing fading estimation.

12. The method of claim 11 wherein said plurality of channels are assigned to said plurality of antennas in a successive manner in said second mode of operation.

13. The method of claim 11 wherein said plurality of channels are assigned to said plurality of antennas in a random manner in said second mode of operation.

14. The method of claim 11 wherein said assigning in said first mode of operation is operable to calculate a respective forward-link power summation for a plurality of assignment combinations of said plurality of channels to said plurality of antennas.

15. The method of claim 11 further comprising:
switching reverse-link signals from said plurality of antennas to a plurality of transceivers such that respective antennas associated with best channel quality metrics for respective channels are provided to respective transceivers.

16. A method for operating a wireless communication system, the method comprising:
generating concurrent forward-link transmit signals for a plurality of channels;
determining a current forward-link power for each of said plurality of channels;
assigning, in a first mode of operation, said plurality of channels to said plurality of antennas for transmission of said concurrent forward-link signals by selecting the antenna assignment that minimizes total forward-link transmit power;
measuring a carrier-to-interference (C/I) ratio associated with a respective reverse link for each of said a plurality of channels on each of a plurality of antennas; and
calculating a power matrix with each term (Pi,k) of said power matrix being equal to (Vk·(C/I)k,k/(C/I)i,k), wherein Vk is a respective forward-link power associated with a kth channel, (C/I)k,k is a respective C/I ratio for the kth channel as received on an antenna that is currently being using for the kth channel, and (C/I)i,k is the respective reverse-link C/I ratio associated with the kth channel as received by the ith antenna.

17. A wireless communication system comprising:
a plurality of antenna means for transmitting forward-link and receiving reverse-link signals;
transceiver means for concurrently generating forward-link signals for a plurality of channels;
switching means for switching said forward-link signals of said plurality of channels to said plurality of antenna means; and
a controller means for controlling said switching means such that each concurrent forward-link signal of said plurality of channels is switched to a different antenna means of said plurality of antennas means, wherein said controller means is operable to cause said switching means to switch a forward-link signal associated with a highest transmit power to an antenna means that is associated with a highest channel quality metric for the reverse-link signal that corresponds to said forward-link signal in a first mode of operation.

18. The wireless communication system of claim 17 wherein said plurality of antennas are arranged to provided at least one item selected from the list consisting of spatial diversity, polarization diversity, and directional diversity.

19. The wireless communication system of claim 17 further comprising:
a receiver means that is operable to calculated a carrier-to-interference (C/I) value for a reverse-link of each of said plurality of channels as received by each of said plurality of antenna means.

20. The wireless communication system of claim 17 wherein said controller means is operable to determine an assignment combination of forward-link signals of said plurality of channels to said plurality of antenna means that minimizes a summation of forward-link power of each of said plurality of channels in a first mode of operation.

21. The wireless communication system of claim 17 wherein said controller means, in a second mode of operation, is operable to assign forward-link signals to said plurality of antennas means in a manner selected from the group consisting of (i) a random manner and (ii) a successive manner.

22. A method for operating a wireless communication system, the method comprising:
generating concurrent forward-link transmit signals for a plurality of channels;
measuring a channel quality metric associated with a respective reverse link for each of said a plurality of channels on each of a plurality of antennas;
determining a current forward-link power for each of said plurality of channels;
assigning, in a first mode of operation, said plurality of channels to said plurality of antennas for transmission of said forward-link signals such that (i) no more than one channel is concurrently transmitted from a respective antenna; and (ii) assignment of said plurality of channels to said plurality of antennas minimizes total forward-link transmit power; and
assigning, in a second mode of operation, said plurality of channels to said plurality of antennas for said forward-link signals when both of the following conditions are true: (i) fading rate of Raleigh fading of said plurality of channels is sufficiently low, and (ii) frequency hopping averaging does not allow for shadowing fading estimation.

23. The method of claim 22 wherein said plurality of channels are randomly assigned to different antennas in said second mode of operation.

24. The method of claim 22 wherein said plurality of channels are successively assigned to different antennas in said second mode of operation.

25. A method for operating a wireless communication system, the method comprising:
generating concurrent forward-link transmit signals for a plurality of channels;
measuring a channel quality metric associated with a respective reverse link for each of said a plurality of channels on each of a plurality of antennas;
determining a current forward-link power for each of said plurality of channels;
assigning, in a first mode of operation, said plurality of channels to said plurality of antennas for transmission of said forward-link signals such that (i) no more than one channel is concurrently transmitted from a respective antenna, and (ii) assignment of said plurality of channels to said plurality of antennas minimizes total forward-link transmit power; and
calculating a power matrix with each term (Pi,k) of said power matrix being equal to (Vk·(C/I)k,k/(C/I)i,k), wherein Vk is a respective forward-link power associated with a kth channel, (C/I)k,k is a respective carrier-to-interference (C/I) ratio for the kth channel as received on an antenna that is currently being using for the kth channel, and (C/I)i,k is the respective reverse-link C/I ratio associated with the kth channel as received by the ith antenna.

* * * * *